US010599873B2

United States Patent
Winstrom et al.

(10) Patent No.: US 10,599,873 B2
(45) Date of Patent: Mar. 24, 2020

(54) METHOD FOR RATE-LIMITING INTERACTIONS BASED ON DYNAMICALLY CALCULATED VALUES BY SUPPLYING PROBLEMS OF VARYING DIFFICULTY TO BE SOLVED

(71) Applicant: Apple Inc., Cupertino, CA (US)

(72) Inventors: Lucas O. Winstrom, Palo Alto, CA (US); Eric D. Friedman, Berkeley, CA (US); Ritwik K. Kumar, San Jose, CA (US); Jeremy M. Stober, Austin, TX (US); Amol V. Pattekar, San Jose, CA (US); Benoit Chevallier-Mames, Paris (FR); Julien Lerouge, San Jose, CA (US); Gianpaolo Fasoli, Redwood City, CA (US); Augustin J. Farrugia, Los Altos Hills, CA (US); Mathieu Ciet, Paris (FR)

(73) Assignee: Apple Inc., Cupertino, CA (US)

( * ) Notice: Subject to any disclaimer, the term of this patent is extended or adjusted under 35 U.S.C. 154(b) by 74 days.

(21) Appl. No.: 15/707,847

(22) Filed: Sep. 18, 2017

(65) Prior Publication Data

US 2018/0089465 A1 Mar. 29, 2018

Related U.S. Application Data

(60) Provisional application No. 62/399,220, filed on Sep. 23, 2016.

(51) Int. Cl.
*H04L 29/06* (2006.01)
*G06F 21/64* (2013.01)
(Continued)

(52) U.S. Cl.
CPC .......... *G06F 21/64* (2013.01); *G06Q 10/107* (2013.01); *H04L 9/3247* (2013.01); *H04L 51/12* (2013.01);
(Continued)

(58) Field of Classification Search
CPC ..................................................... G06F 21/64
See application file for complete search history.

(56) References Cited

FOREIGN PATENT DOCUMENTS

EP    1655655    5/2006

OTHER PUBLICATIONS

Laurie, Ben, and Richard Clayton. "Proof-of-work proves not to work; version 0.2." Workshop on Economics and Information, Security. 2004. (Year: 2004).*

(Continued)

*Primary Examiner* — Shawnchoy Rahman
(74) *Attorney, Agent, or Firm* — Womble Bond Dickinson (US) LLP

(57) ABSTRACT

Systems and methods are described for rate-limiting a message-sending client interacting with a message service based on dynamically calculated risk assessments of the probability that the client is, or is not, a sender of a spam messages. The message service sends a proof of work problem to a sending client device with a difficulty level that is related to a risk assessment that the client is a sender of spam messages. The message system limits the rate at which a known or suspected spammer can send messages by giving the known or suspected spammer client harder proof of work problems to solve, while minimizing the burden on normal users of the message system by given them easier proof of work problems to solve that can typically be solved by the client within the time that it takes to type a message.

18 Claims, 13 Drawing Sheets

(51) Int. Cl.
*G06Q 10/10* (2012.01)
*H04L 12/58* (2006.01)
*H04L 9/32* (2006.01)
*G06F 21/55* (2013.01)

(52) U.S. Cl.
CPC .......... *H04L 51/22* (2013.01); *H04L 63/1441* (2013.01); *G06F 21/55* (2013.01); *H04L 2463/144* (2013.01)

(56) References Cited

OTHER PUBLICATIONS

Dwork, Cynthia, and Moni Naor. "Pricing via processing or combatting junk mail." Annual International Cryptology Conference. Springer, Berlin, Heidelberg, 1992. (Year: 1992).*
Leiding, Benjamin, et al. "Authcoin: validation and authentication in decentralized networks." arXiv preprint arXiv:1609.04955 (2016). (Year: 2016).*
Dwork, Cynthia, Andrew Goldberg, and Moni Naor. "On memory-bound functions for fighting spam." Annual International Cryptology Conference. Springer, Berlin, Heidelberg, 2003 (Year: 2003).*
"Bitcoin", Wikipedia entry, accessed at: https://en.wikipedia.org/wiki/Bitcoin on Jun. 16, 2017, last updated Jun. 15, 2017, 14 pages.

\* cited by examiner

METHOD FOR RATE-LIMITING INTERACTIONS BASED ON DYNAMICALLY CALCULATED VALUES BY SUPPLYING PROBLEMS OF VARYING DIFFICULTY TO BE SOLVED

RELATED APPLICATIONS

This application claims priority of U.S. Provisional Patent Application No. 62/399,220 entitled "METHOD FOR RATE-LIMITING INTERACTIONS BASED ON DYNAMICALLY CALCULATED VALUES BY SUPPLYING PROBLEMS OF VARYING DIFFICULTY TO BE SOLVED," to Lucas O. Winstrom, filed Sep. 23, 2016, and is incorporated herein by reference in its entirety to the extent that it is consistent with this application.

TECHNICAL FIELD

This disclosure relates to the field of deterring or preventing transmission of spam communication by a transmitting client device.

BACKGROUND

Some users of a message system send high volumes of unsolicited, unwanted messages ("spam") to users of the messaging system. Often the spam messages are advertising. Sometimes spam messages contain malicious software or links that may attack the device receiving the message, attempt to obtain private user information, or otherwise perform malicious actions. Administrators of message systems want to protect users of the messaging system from such attacks via messages. Administrators of messaging systems also do not want to provide resources to process the high volume of spam messages.

Current methods of detecting spam, or a sender of spam, rely upon the message system accessing the clear text of a message. The clear text of the message is analyzed to determine keywords that may indicate spam. Message attachments may be scanned to determine whether they contain malware or spam. A message determined to be spam may be quarantined or put into a special folder on the message service or on the receiving client device. However, reliance upon a server reading the clear text of a message does not work when the message is encrypted. Further, quarantining messages does not slow, deter, or stop a sender of spam from continuing the practice of sending spam messages. Thus, message services continue to have to spend resources on analyzing received messages and users continue to receive the spam messages. The spammer does not incur any computational cost for having sent the spam messages and is not deterred, delayed, or otherwise discouraged from continuing the practice of sending spam messages over the messaging service to receiving clients.

SUMMARY OF THE DESCRIPTION

Embodiments are described for rate-limiting a message-sending client interacting with a message service based on dynamically calculated risk assessments of the probability that the client is, or is not, a sender of a spam (or other undesired) messages. The message service can send a proof of work problem to a sending client device that has a proof of work problem classification with a difficulty level that is related to the currently calculated risk assessment that the client is, or is not, a sender of spam (or other undesired) messages. By selecting proof of work problems with a difficulty that is related to a risk that a client will send spam (or other undesired message), the message system can limit the rate at which a known or suspected spammer can send messages by giving the known or suspected spammer client harder proof of work problems to solve, while minimizing the burden on normal users of the message system by given them easier proof of work problems to solve that can typically be solved by the client within the time that it takes to type (or otherwise enter) a message. Increased difficulty of proof of work problems for spammers also increases the cost to the spammer to send a message as the spammer must solve increasingly difficult proof of work problems the longer that the spammer persists in sending spam messages.

In a first embodiment, a first (sending) client device can request that a message service send a message to a second (receiving) client device. The first client device can receive a proof of work problem to solve with a difficulty that is related to a risk assessment as to whether the first client device is a sender of spam messages. The proof of work problem can be digitally signed so that the proof of work problem can later be verified as having been assigned to the first client device by the message service. The first client device can attempt to solve the proof of work problem within an allotted time. The first client device can send the proof of work problem, solution, and digitally signed version of the proof of work problem to a problem verifier service. The first client device can receive a verification result from the problem verifier service and pass the verification result to the message service. The verification result can be signed by the problem verification service so that the message service can verify that the verification result was sent by the problem verifier service. If the verification result indicates that the first client device correctly solved the proof of work problem within the allotted time, and the digital signature of the verification result and digital signature of the proof of work problem are verified, then message service can send the message to the second client device.

In another embodiment, a message service can receive a request from a first client device to send a message to a second client device. The message service can request that a fraud service determine a risk assessment of the requesting first client device. The message service can receive a proof of work problem classification from the fraud service that is related to the current risk assessment that the requesting first client device is a sender of spam messages. The message service can digitally sign the problem classification and send it to a problem service. The message service can receive, from the problem service, a proof of work problem and a digitally signed version of the proof of work problem. The message service can verify that the proof of work problem came from the problem service by the digital signature on the proof work problem. The message service can send the proof of work problem, and digitally signed proof of work problem, to the first client device. The message service can receive, from the first client device, the proof of work problem, digitally signed proof of work problem, a verification result, and the original request for service send by the requesting first client device to the message service. The verification result can be digitally signed by a problem verifier service. The message service can be determined whether the verification result indicates that the first client device correctly solved the proof of work problem within the allotted time, and the digital signature of the verification result and digital signature of the proof of work problem are verified. If so, then message service can send the message to the second client device. The message service can log the initial request for message service by first client device, the assignment of the proof of work problem to the first client device, and the verification result received from the first client device.

In another embodiment, a fraud service can receive a request from a message service to perform a risk assessment on a requesting client device and determine a proof of work problem classification for this client device, for this request. If the same client device makes a second request for message service, then the message service can make a new request for a risk assessment and related proof of work problem classification for the second request. Risk assessment information can be updated periodically based on information provided by an analytics service. Thus, a risk assessment, and associated proof of work problem classification can change over time for a given client device and may be different for multiple requests by the same client device and different client devices at the same time can have different problem classifications based on different risk assessments.

In yet another embodiment, a problem service can receive a request to provide a proof of work problem to a requesting message service or client device. The problem service can receive a problem classification that is digitally signed by the fraud service or message service so that the problem service can verify that the problem classification originated from the fraud service or was forwarded to the problem service by the message service, possibly via the first client device. A proof of work problem can be selected having a difficulty that is based at least in part on the proof of work problem classification. Selection of a proof of work problem can also be based in part on a type of hardware that the client device will use to solve the problem. Problem service may give a harder problem to a client device that is running virtualized hardware. Problem service may give an easier problem to a portable device that is running older hardware. Problem service can receive updated problem sets from fraud service. Problem service can select a problem that is referenced within a library on the client device. Problem service can detect a version of a problem set that the client device has and require the client device to obtain an updated problem set library before problem service will provide a proof of work problem. Problem service can send the problem, and a digitally signed version of the problem, to the requesting message service or client device. The client device can read the problem, but cannot access the digitally signed version of the problem because the client device does not have a key or shared secret necessary to decrypt the digital signature of the problem service. The message service can verify that the digitally signed proof of work problem originated from the problem service by decrypting the digitally signed version of the proof of work problem using a shared secret between the message service and problem service, such as a symmetric or public key of the problem service.

In still another embodiment, a problem verifier service can verify that a client device solved a proof of work problem within an allotted period of time. The problem verifier can also verify a digital signature of the problem service on the digitally signed proof of work problem using a shared secret between the problem verifier service and the problem service, such as a symmetric key or public key of the problem service. The problem verifier service can also verify the digital signature of the message service, or fraud service, on the proof of work problem classification using a shared secret between the problem verifier service and message service, or fraud service, such as a symmetric key or public key of the message service, or fraud service.

In another embodiment a non-transitory computer readable can store executable instructions, that when executed by a processing system, can perform any of the method functionality described above.

In yet another embodiment, a processing system comprising at least one hardware processor, coupled to a memory programmed with executable instructions can, when the instructions are executed by the processing system, perform any of the method operations described above.

Some embodiments described herein can include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

The present disclosure recognizes that the use of such personal information data, here the identity of a computing device, in the present technology, can be used to the benefit of users. For example, the personal information data can facilitate access to services by the user with the computing device. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined by the appended claims.

Figure 1:
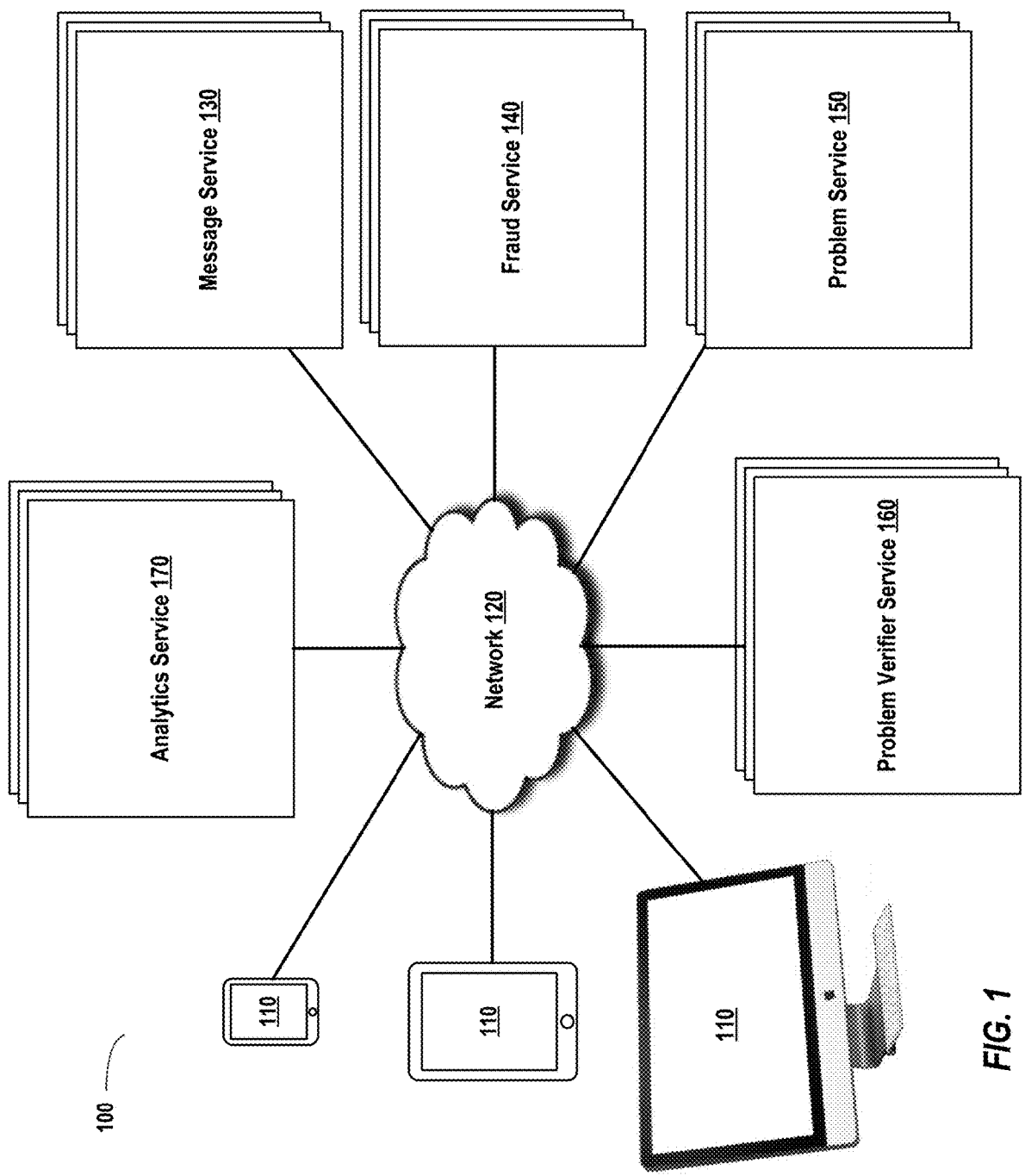
FIG. 1 illustrates, in block form, an overview of a system that rate-limits interactions between a sending client device and a message service based on dynamically calculated values by supplying problems of varying difficulty to be solved to the sending client device, according to some embodiments.

FIG. 1 illustrates, in block form, an overview of a system 100 that rate-limits interactions with a message service 130 based on dynamically calculated values by supplying problems of varying difficulty to be solved to a sending client device 110, according to some embodiments. In one embodiment the values are dynamically calculated on a per sender basis based on currently available information about the sender.

In the description that follows, some elements may be digitally signed by a first service, e.g. problem service 150, then directly or indirectly transmitted to another service, e.g., problem verifier service 160. An element, such as a proof of work problem ("problem") signed by a service, e.g. problem service 150, is indicated by $sign_{150}(problem)$. A subsequent service, e.g. verifier service 160, may digitally sign a digitally signed element, e.g. $sign_{150}(problem)$, and is indicated by, e.g., $sign_{160}(sign_{150}(problem))$.

A system 100 that rate-limits interactions by client devices 110 with a message service 130 can include a plurality of client devices 110 coupled via a network 120 to a message service 130, a problem service 150, and a problem verifier service 160. The message service 130 can be coupled via the network 120 with a fraud service 140 and an analytics service 170. Network 120 can be any type of network including an Ethernet network, a token ring network, the Internet, a USB network, a wireless network, a cellular network, or other type of network. In an embodiment, one or more of message service 130, fraud service 140, problem service 150, problem verifier 160, and analytics service 170 can be implemented on a single computer server. In another embodiment, each service can be implemented on a separate and distinct server system. Exemplary hardware for such a server can be as described below with reference to FIG. 10. In such an embodiment, a first service, e.g. message service 130, can call a second service, e.g. fraud service 140, using an application programming interface (API), interprocess communication, messaging, sockets, or other communication medium. An exemplary API is described below with reference to FIG. 9.

A client device 110 can be a tablet computer, such as an iPad®, a desktop computer, such as an iMac®, or a portable device such as a smart phone, e.g. an iPhone®. Example internal hardware components of a computing device 110 are described below with reference to FIG. 10.

A message service 130 can be any type of message service, including email, text, SMS message, an Apple® iMessage® service, or other messaging service. In an embodiment, messages transmitted via message service 130 can be encrypted. A first client device 110 can request, from message service 130, that message service 130 send a message from the first (sending) client device 110 to a second (receiving) client device 110. In an embodiment, the message can be encrypted using a private key (if asymmetric cryptography is used) of the first client device 110. Second client device 130 can decrypt the message using a public key of the first client device 110. In another embodiment, the message can be encrypted using a public key of the second (receiving) client device and decrypted using the private key of the second client device.

Message service 130 can request from fraud service 140 a proof of work problem classification for the first client device 110 that can be used to select a proof of work problem for the first client device 110. The message service 130 can require that first client device 110 provide a timely and verified solution to the proof of work problem before message service 130 will transmit the message to the second client device 130 on behalf of the first client device 110. In an embodiment, the problem classification can be digitally signed by fraud service 140, indicated by $sign_{140}$(classification), so that message service 130 can verify that the problem classification came from the fraud service 140 using a shared secret between the message service 130 and fraud service 140, such as a symmetric or public key of fraud service 140. Message service 130 can send the digitally problem classification to problem service 150 to request a proof of work problem in accordance with the problem classification. In another embodiment, message service 130 can pass the digitally signed problem classification to the first client device 110, and the first client device 110 can request the proof of work problem and the first client device 110 can receive the proof of work problem from the problem service 150.

Message service 130 can log the request for service from first client 110, the problem classification returned from the fraud service 140, and the proof of work problem returned from the problem service 150. Message service 130 can also log verification results of proof of work problems returned to message service 130. Analytics service 170 can use the logged information to generate one or more reports over time for fraud service 140 to aid in determining the risk that a client device 110, or a user of the client device 110, is a sender of spam messages and thus the risk (and the corresponding problem classification) can change over time, and different senders can have different levels of risk. Although the message service 130 can store information for later analysis by the analytics service 170 to update risk assessment information, the message service 130 need not store and track the state of a request for service by a client device, the classification or problem assigned to the requesting client device, signatures associated with information passed between services, and other state information. The message service 130 can be stateless with respect to the request that the message service 130 send a message from a first client device 110 to a second client device 110. State information, if any, can be stored by the client device 110 that requests service from the message service 130.

Fraud service 140 can determine a risk that a first (sending) client device 110, or a user associated with the first client device 110, is a sender of spam. Based upon the risk determination, fraud service 140 can determine a proof of work problem classification, used by a problem service 150 for selecting a proof of work problem that the first client device 110 must solve before message service 130 will send a message to second (receiving) client device 110 on behalf of first client device 110. In an embodiment, fraud service 140 can digitally sign the problem classification, indicated as $sign_{140}$(classification). In an embodiment, fraud service 140 can use an identifier of the first client device 110, or an identifier of a user of the first client device 110, to look up a stored risk value for the first client device 110. An identifier of the first client device 110 can include a unique identifier of the device such as a BIOS identifier, a universally unique identifier of the device, a processor identifier, a MAC address, or other hardware identifier, or a virtual equivalent of a hardware identifier. A user identifier can include login credentials, a fingerprint scan, or other biometric, an account identifier associated with the user, such as a Apple® iMessage® sender address, an email address, a phone number, an AppStore account identifier, Apple® iTunes® account identifier or other user identifier.

Fraud service 140 can determine the current stored risk value from analytics provided by analytics service 170, including such information as a number of messages sent by the first client device over a predetermined period of time, such as one day, and a number of messages that the first client device received during the same predetermined period of time, possibly indicating a high risk that the user is a sender of spam messages. Fraud service 140 can also use the country of origin of the sender, internet protocol address, or other indication of the location of the sending client device as a factor in determining risk that the sending client device is a sender of spam messages. In an embodiment, fraud service 140 can access an account of the user to determine information about the user, such as how many purchases of applications, media, e-books, music, or other content the user has performed to determine that the user is not likely to be a sender of spam. In an embodiment, a user may be a new user having no account or a new account with little or no activity. For a new user, the fraud service 140 may determine a medium level of risk that the user is a sender of spam. The foregoing indications can be used alone or in combination to determine a risk assessment value of a sending client device.

A problem service 150 can select a proof of work problem for the first client device 110 to solve, based on the proof of work classification determined by the fraud service 140. Problem service 150 can digitally sign the selected proof of work problem, indicated by $sign_{150}$(problem), and return both the signed and unsigned proof of work problem to the message service 130 for forwarding to the first client device 110. In embodiments wherein the first client device 110 requests the proof of work problem, the problem service 150 can send the signed and unsigned proof of work problem to the first client device 110.

A proof of work problem can be any type of problem, such as solving "determine a value Y such that HASH(Y)=X, where X is a given random number," or "determine the seventh prime number following the integer 123." The hashing function can be any hashing function, such as SHA128, SHA256, or other hashing function. In an embodiment, the proof of work problem can be selected such that the problem is designed to utilize more memory than is provided in a cache of the hardware type for the first client device 110, thereby forcing the first client device 110 to compute a solution to the problem using conventional memory. The proof of work problem can be implemented in a Java® script, HTML, XML code, or other scripting language, or a combination of these. The problem can be selected from a predetermined list of problems stored on, or accessible by, the problem service 150. The problem can be selected from a list of publicly known algorithms having varying difficulty. The problem can be selected from a set of problems stored on, or accessible by, the first client device 110. In an embodiment, a problem set can be hard-coded into the first client device 110. In an embodiment, the problem set on the first client device 110 and/or the problem server 150 can be dynamically updateable. In an embodiment, a problem set can be dated via JavaScript, JavaScript Objection Notation (JSON), a markup language such as HTML, XML, or a combination of any of these. In an embodiment, the problem set of the first client device 110 can be updated in response to determining that the first client device 110 is using a problem set that is out of date. Updating a problem set on a first client device 110 can include transmitting a new problem set to the first client device 110, optionally including a seed value. In an embodiment, fraud service 140 can update the problem set on problem service 150. In an embodiment, fraud service 140 or problem service 150 can require the first (sending) client device to update its problem set before receiving a proof of work problem. In an embodiment, problem service 150 can generate or select different proof work problems for two client devices having a same problem classification level but different hardware types. For example, problem service 150 may generate a more difficult problem for hardware that is determined to be virtualized than for a portable electronic device such as a smart phone.

Problem verifier service 160 can verify that the first client device 110 solution to the proof of work problem is correct. Problem verifier service 160 can receive the proof of work problem, solution computed by the first client device 110, and digitally signed problem, $sign_{150}(problem)$, from first client device 110. Problem verifier service 160 can verify one or more of: determining the correctness of the solution provided by the first client device 110, determining whether the first client device 110 solved the proof work problem within an allotted amount of time, determining whether the digital signature of the signed problem matches the problem service 150. If one or more of the foregoing criteria are not met, problem verifier service 160 can return an indication that the proof of work solution is "not verified." In an embodiment, problem verifier service 160 can return a verification result of "not verified" without an indication as to why the verification result is "not verified," to make it more difficult to attack the problem verifier service 160.

In an embodiment, problem verifier service 160 can delay responding to the first client device 110 request for verification of the proof of work solution. The delay, if any, can be based at least in part upon the proof of work problem classification, problem difficulty, or risk assessment of the first client device 110. The amount of delay, if any, can be determined using one or more of the hardware type of the first client device 110 and problem classification of the first client device 110. For example, virtualized hardware, and/or high risk first client devices 110 may be delayed longer than portable electronic devices or low risk client devices. Problem verifier service 160 can then send the proof of work problem, digitally signed problem, $sign_{150}(problem)$, and digitally signed version of the digitally signed problem, $sign_{160}(sign_{150}(problem))$, to the first client device 110 for forwarding to the message service 130.

Analytics service 170 can retrieve logs from message service 130 and generate one or more reports for fraud service 140 to update risk tables of client devices 110 and users. In an embodiment, message service 130 can push logs to the analytics service 170 to generate reports for fraud service 140 to update risk tables of client devices 110 and users. In an embodiment, message service 130 may push logs to analytic service 170 based upon a number, or rate of increase, of log entries during a predetermined period of time, such as 1 hour, 4 hours, 12 hours, or one date. In an embodiment, analytics service 170 can use the logs to determine a number of proof of work problems assigned to a particular client device 110 over a predetermined period of time (e.g. one day), whether or not the client device 110 received any messages during the predetermined period of time, how long it took the client device 110 to solve a proof of work problem, how many problems the client device 110 solved, or did not solve, whether the digital signature of a problem classification did not match the proof of work problem digital signature, whether the client device 110 is using virtualized hardware, and other metrics that can indicate a risk value that the client device 110 may be sending spam messages.

Figure 2A:
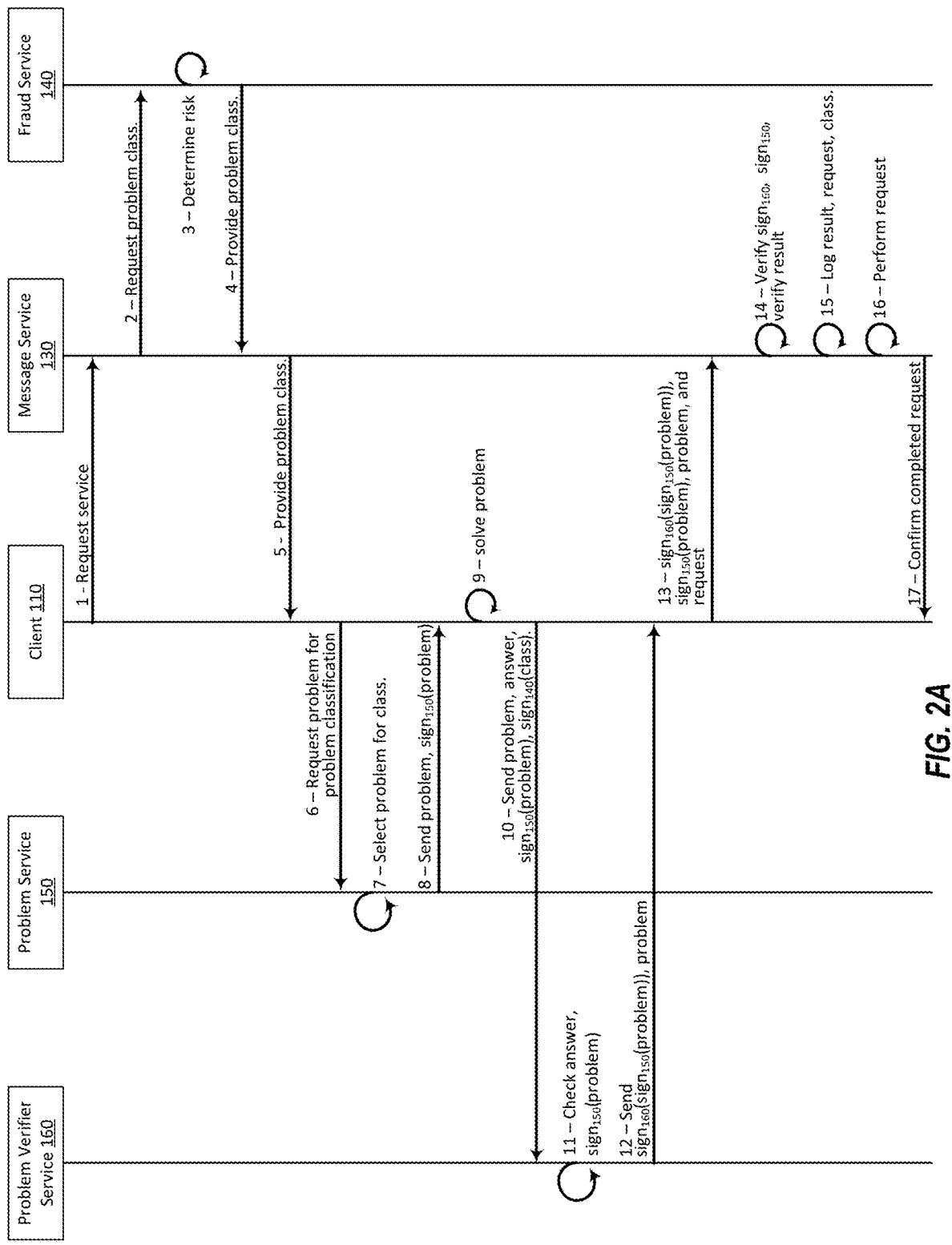
FIG. 2A illustrates, in block form, communication flow between components of a system that rate-limits interactions with a message service based on dynamically calculated values by supplying problems of varying difficulty to be solved to a sending client device, obtained by the sending client device from a problem service, according to some embodiments.

FIG. 2A illustrates, in block form, communication flow between components of a system 100 that rate-limits interactions with a message service 130 based on dynamically calculated values by supplying problems of varying difficulty to be solved to a sending client device, obtained by the sending client device 110 from a problem service 150, according to some embodiments. In FIG. 2A, the first client device 110 can request a proof of work problem from problem service 150. In another embodiment, shown in FIG. 2B, the message service 130 can request the proof of work problem from the problem service 150 on behalf of the first (sending) client device 110.

In FIG. 2A, operation 1, a first (sending) client device 110 can request that message service 130 send a message to a second client device 110 on behalf of the first client device 110. The request can include information that identifies the first client device 110 hardware and/or a sender associated with the first client device 110. The request can further include a date/time stamp of the request and an address or other identifier associated with the second (recipient) client device 110.

In operation 2, message service 130 can request that fraud service 140 provide a proof of work problem classification for the first client device. In an embodiment, the problem classification can be digitally signed by the fraud service 140, indicated as $sign_{140}(classification)$. The proof of work classification can be used by the problem service 150 to determine a proof of work problem for the first (sending) client device 110 to solve, before message service 130 will send the message to the second (receiving) client device 110 on behalf of first client device 110.

In operation 3, fraud service 140 can determine a risk level that the first client device 110, or a sender associated with the first client device 110, is a known or suspected sender of spam. In an embodiment, fraud service 140 can use hardware identification information, or identification information of a user or an account associated with the user, to look up a risk value in a database accessible to the fraud service 140. Fraud service 140 can periodically receive update information from analytics service 170 to update risk determination information.

In operation 4, fraud service 140 can determine a proof of work problem classification associated with the risk that the first (sending) client device 110 is a sender of spam messages. Fraud service 140 can digitally sign the problem classification, indicated by $sign_{140}(classification)$, using a shared secret that is known to message service 130, fraud service 140, and problem service 150. Fraud service 140 can return to the message service 130 the digitally signed problem classification with a date time stamp and identifying information related to the first client device 110 and the second client device 110.

In operation 5, message service 130 can provide the digitally signed proof of work classification to the first client device 110. The digitally signed classification, signed by the fraud service 140, can be indicated as $sign_{140}(classification)$. In an embodiment, message service 130 can time stamp and log the receipt of the problem classification from fraud service 140. Analytics service 170 can retrieve message service 130 logs periodically for use in updating risk determination information.

In operation 6, first client device 110 can request a proof of work problem in accordance with the signed problem classification, $sign_{140}(classification)$.

In operation 7, problem service 150 can select a proof of work problem for the first (sending) client device 110 to solve. The difficulty of the proof of work problem selected can be based on the problem classification received from the message service 130.

In operation 8, problem service 150 can send the selected proof of work problem, and a digitally signed version of the proof of work problem, indicated by sign iso(problem), to the first client device 110.

In operation 9, first client device 110 can receive, and attempt to solve, the proof of work problem received from problem service 150.

In operation 10, first client device 110 can send the solution to the proof of work problem, along with the digitally signed proof of work problem, $sign_{150}(problem)$, to problem verifier service 160.

In operation 11, problem verifier service 160 can check the solution to the proof of work problem provided by the first client device 110. Problem verifier 160 can use a shared secret with problem service 150 to check that the digital signature on the proof of work problem, $sign_{150}(problem)$, as being that of the problem service 150, to verify that the problem solved by the first client device 110 was, in fact, provided by the problem service 150. The shared secret can be a symmetric key or public key of an asymmetric key pair of problem service 150. Problem verifier service 160 can further determine how long it took the first client device 110 to solve the proof of work problem, and whether the correct solution was provided within a predetermined window of time allotted for solving the proof of work problem. Problem verifier service 160 can also determine whether to delay returning a verification result to the first client device 110, to further rate-limit the pace at which the first client device 110 can send messages. In an embodiment, the amount of delay, if any, can be related to a difficulty of the proof of work problem difficulty and/or the problem classification.

In operation 12, problem verifier service 160 can return the unsigned problem and a digitally signed verification result, indicated by $sign_{160}(sign_{150}(problem))$, to first client device 110. The verification result can include an indication that the proof of work problem was solved correctly, or was not solved correctly. In an embodiment, problem verification service 160 may not return a verification result if the verification result indicates that the verification was not successful.

In operation 13, first client device 110 can send to the message service 130 the signed proof of work problem verification result, $sign_{160}(sign_{150}(problem))$, the signed proof of work problem, $sign_{150}(problem)$, the unsigned proof of work problem, and the original request to transmit a message from the first client device 110 to second client device 110.

In operation 14, message service 130 can verify the problem verifier service 160 digital signature, to ensure that the verification result came from the problem verifier service 160. In an embodiment, message service 130 can further verify the digital signature of the problem service 150, to ensure that the verification result is based upon a proof of work problem generated by the problem service 150. Message service can further examine the problem verifier service 160 indication to determine whether any/all of: the correct solution to the proof of work problem was provided to the problem verifier service 160, the correction solution was provided within a predetermined window of time, or the digital signature of the problem service 150 was verified by the problem verifier service 160.

In operation 15, message service 130 can time stamp and log the receipt of the digitally signed verification result, $sign_{160}(sign_{150}(problem))$, the digitally signed problem, $sign_{150}(problem)$, the problem, and original request for service.

In operation 16, after the message service 130 validates the verification result, the message service 130 can transmit the message from first client device 110 to second client device 110.

In operation 17, message service 130 can optionally transmit a confirmation of completed message service request to the requesting first client device 110.

Figure 2B:
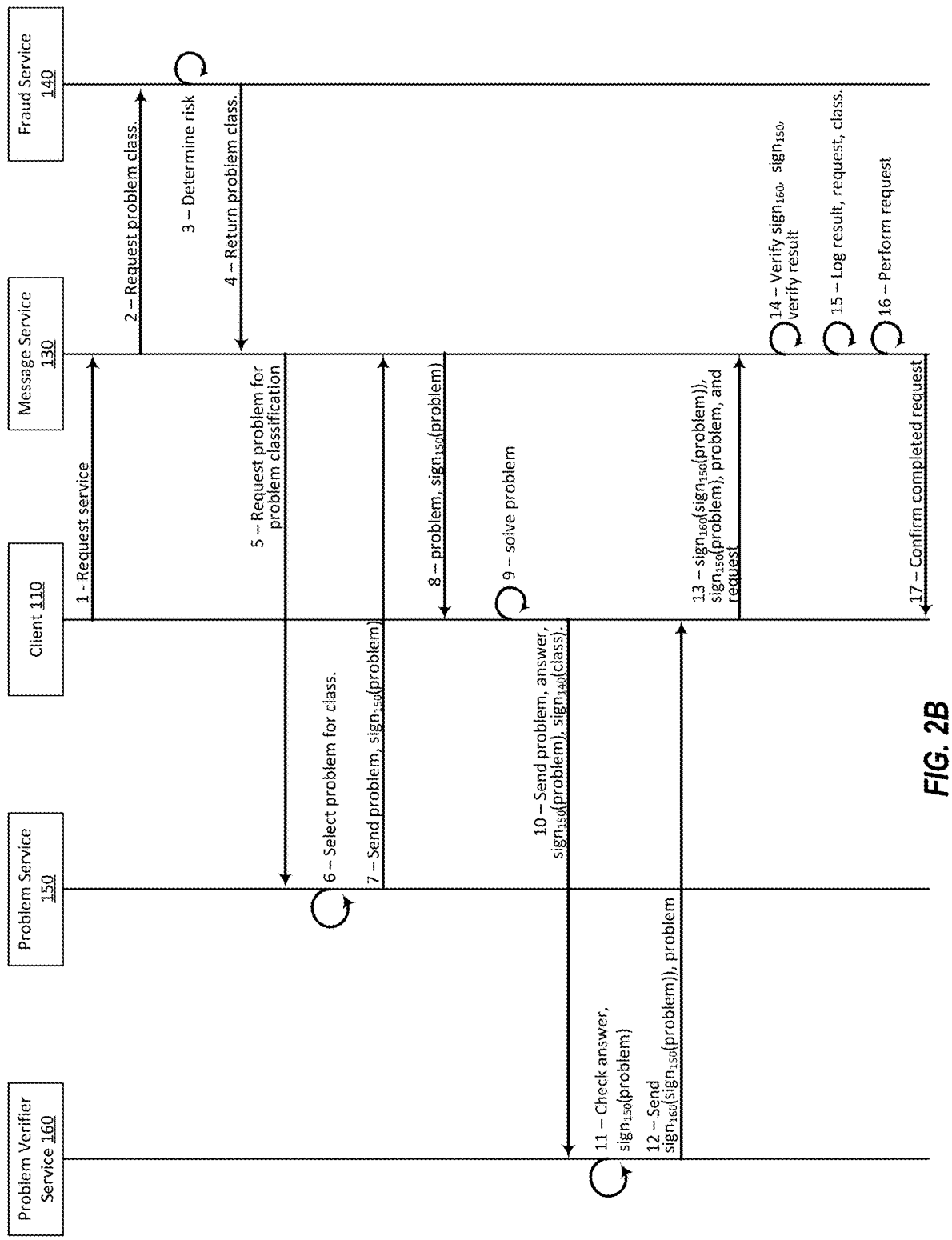
FIG. 2B illustrates, in block form, communication flow between components of a system that rate-limits interactions with a message service based on dynamically calculated values by supplying problems of varying difficulty to be solved to a sending client device, obtained by the message service from a problem service and provided to the sending client device, according to some embodiments.

FIG. 2B illustrates, in block form, communication flow between components of a system 100 that rate-limits interactions with a message service 130 based on dynamically calculated values by supplying problems of varying difficulty to be solved to a sending client device, obtained by the message service from a problem service and provided to the sending client device, according to some embodiments. In FIG. 2B, the message service 130 requests a proof of work problem on behalf of first client device 110 and provides the proof of work problem to the first client device 110.

In FIG. 2B, operation 1, a first (sending) client device 110 can request that message service 130 send a message to a second client device 110 on behalf of the first client device 110. The request can include information that identifies the first client device 110 hardware and/or a sender associated with the first client device 110. The request can further include a date/time stamp of the request and an address or other identifier associated with the second (recipient) client device 110.

In operation 2, message service 130 can request that fraud service 140 provide a proof of work problem classification for the first client device 110. In an embodiment, the problem classification can be digitally signed by the fraud service 140, indicated as $sign_{140}(classification)$. The proof of work classification can be used by the problem service 150 to determine a proof of work problem for the first (sending) client device 110 to solve, before message service 130 will send the message to second (receiving) client device 110 on behalf of first client device 110.

In operation 3, fraud service 140 can determine a risk level that the first client device 110, or a sender associated with the first client device 110, is a known or suspected sender of spam. In an embodiment, fraud service 140 can use hardware identification information, or identification information of a user or an account associated with the user, to look up a risk value in a database accessible to the fraud service 140. Fraud service 140 can periodically receive update information from analytics service 170 to update risk determination information.

In operation 4, fraud service 140 can determine a proof of work problem classification associated with the risk that the first (sending) client device 110 is a sender of spam messages. Fraud service 140 can digitally sign the problem classification, indicated by $sign_{140}(classification)$, using a shared secret that is known to message service 130, fraud service 140, and problem service 150. Fraud service 140 can return to the message service 130 the digitally signed problem classification with a date time stamp and identifying information related to the first client device 110 and the second client device 110. In an embodiment, message service 130 can time stamp and log the receipt of the problem classification from fraud service 140. Analytics service 170 can retrieve message service 130 logs periodically for use in updating risk determination information.

In operation 5, message service 130 can request a digitally signed proof of work problem from the problem service 150 in accordance with the problem classification received from the fraud service 140. The request can include the problem classification. In an embodiment, the problem classification can be digitally signed by the fraud service 140, indicated by $sign_{140}(classification)$.

In operation 6, problem service 150 can select a proof of work problem for the first (sending) client device 110 to solve. The difficulty of the proof of work problem selected can be based on the problem classification received from the message service 130.

In operation 7, problem service 150 can send the selected proof of work problem, and a digitally signed version of the proof of work problem, indicated by $sign_{150}(problem)$, to the message service 130.

In operation 8, message service 130 can transmit the proof of work problem, and digitally signed proof of work problem, indicated by $sign_{150}(problem)$, to first client device 110.

In operation 9, first client device 110 can receive, and attempt to solve, the proof of work problem received from message service 130.

In operation 10, first client device 110 can send the solution to the proof of work problem, along with the digitally signed proof of work problem, $sign_{150}(problem)$, to problem verifier service 160.

In operation 11, problem verifier service 160 can check the solution to the proof of work problem provided by the first client device 110. Problem verifier 160 can use the shared secret with problem service 150 to check that the digital signature on the proof of work problem, $sign_{150}(problem)$, as being that of the problem service 150, to verify that the problem solved by the first client device 110 was, in fact, provided by the problem service 150. Problem verifier service 160 can further determine how long it took the first client device 110 to solve the proof of work problem, and whether the correct solution was provided within a predetermined window of time allotted for solving the proof of work problem. Problem verifier service 160 can also determine whether to delay returning a verification result to the first client device 110, to further rate-limit the pace at which the first client device 110 can send messages. In an embodiment, the amount of delay, if any, can be related to a difficulty of the proof of work problem difficulty and/or the problem classification.

In operation 12, problem verifier service 160 can return the unsigned problem and a digitally signed verification result, indicated by $sign_{160}(sign_{150}(problem))$, to first client device 110. The verification result can include an indication that the proof of work problem was solved correctly, or was not solved correctly. In an embodiment, problem verification service 160 may not return a verification result if the verification result indicates that the verification was not successful.

In operation 13, client device 110 can send to the message service 130 the signed proof of work problem verification result, $sign_{160}(sign_{150}(problem))$, the signed proof of work problem, $sign_{150}(problem)$, the unsigned proof of work problem, and the original request to transmit a message from the first client device 110 to second client device 110.

In operation 14, message service 130 can verify the problem verifier service 160 digital signature, to ensure that the verification result came from the problem verifier service 160. Message service 130 can further verify the digital signature of the problem service 150, to ensure that the verification result is based upon a proof of work problem generated by the problem service 150. Message service can further examine the problem verifier service 160 indication to determine whether any/all of: the correct solution to the proof of work problem was provided to the problem verifier service 160, the correction solution was provided within a predetermined window of time, or the digital signature of the problem service 150 was verified by the problem verifier service 160.

In operation 15, message service 130 can time stamp and log the receipt of the digitally signed verification result, $sign_{160}(sign_{150}(problem))$, the digitally signed problem, $sign_{150}(problem)$, the problem, verification result, and original request for service.

In operation 16, after the message service validates the verification result, the message service 130 can transmit the message from first client device 110 to second client device 110.

In operation 17, message service 130 can optionally transmit a confirmation of completed message service request to the requesting first client device 110.

Figure 3A:
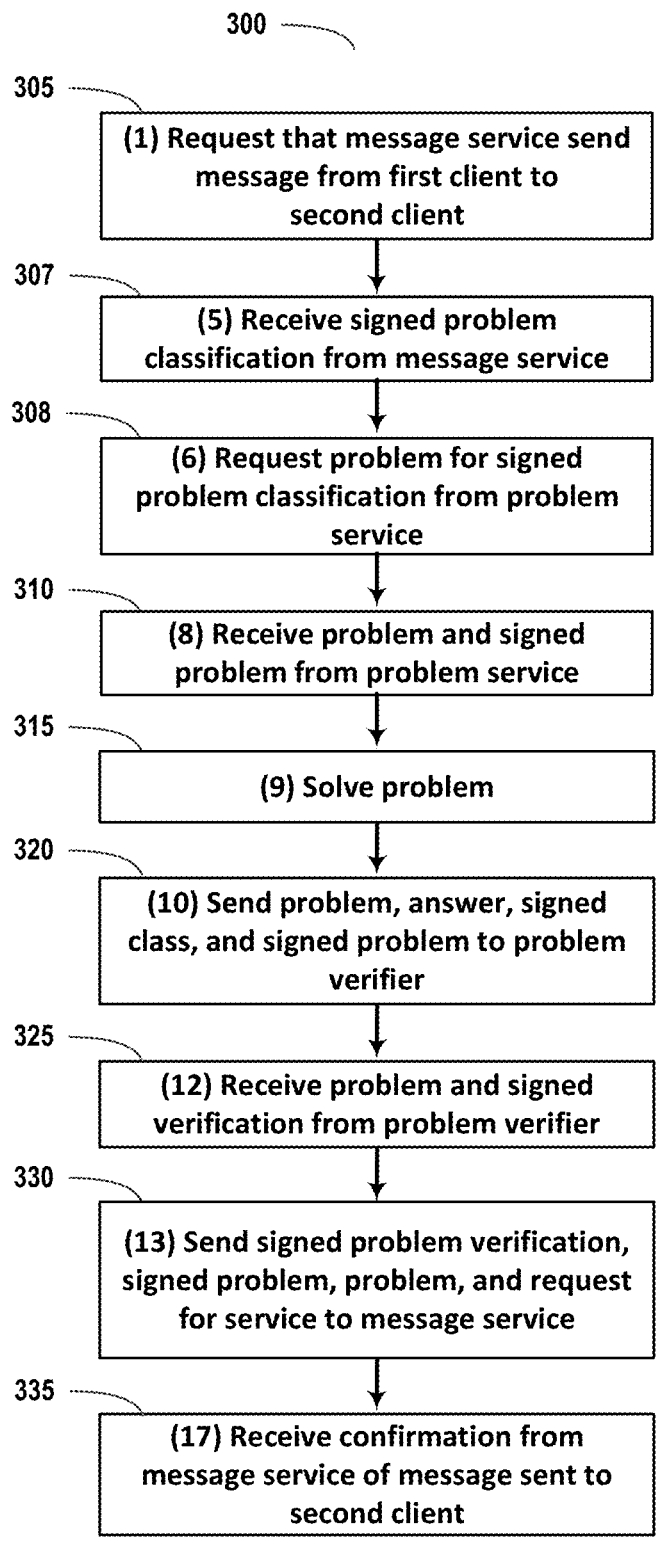
FIG. 3A illustrates, in block form, a method of sending a message by a first (sending) client device to a second (receiving) client device in a system that rate-limits interactions with a message service based on dynamically calculated values by supplying problems of varying difficulty to be solved to a sending client device, obtained by the sending client device from a problem service, according to some embodiments.

FIG. 3A illustrates, in block form, a method 300 of a client device 110 sending a message by a first (sending) client device to a second (receiving) client device in a system that rate-limits interactions with a message service based on dynamically calculated values by supplying problems of varying difficulty to be solved to a sending client device 110, obtained by the sending client device from a problem service, according to some embodiments. The following description of FIG. 3A is based upon the embodiment shown in FIG. 2A, wherein the first client device 110 requests a proof of work problem from a problem service 150.

In FIG. 3A, operation 305, a first (sending) client device 110 can request that message service 130 send a message to a second (receiving) client device.

In operation 307, first client device 110 can receive a proof of work problem classification from message service 130. In an embodiment, the problem classification can be digitally signed by fraud service 140, indicated as $sign_{140}$(classification).

In operation 308, first client device 110 can request that problem service 150 provide to first client device 110 a proof of work problem based upon the problem classification received by the first client device 110 from the message service 130 in operation 307. First client device 110 can provide the signed problem classification to the problem service 150 in the request for a proof of work problem.

In operation 310, first client device 110 can receive a proof of work problem, and a digitally signed version, $sign_{150}$(problem) of the proof of work problem from problem service 150. The proof of work problem can be selected by problem service 150 based upon a problem classification determined by fraud service 140, forwarded to message service 130, and forwarded again to problem service 150 on behalf of the first client device 110.

In operation 315, first client device 110 can attempt to solve the proof of work problem.

In operation 320, first client device 110 can send the proof of work problem, solution, and digitally signed proof of work problem, $sign_{150}$(problem) to a problem verifier service 160. In an embodiment, the first client device 110 can also send the digitally signed problem classification, $sign_{140}$(classification) to the problem verifier service 160.

In operation 325, first client device 110 can receive a verification result from problem verifier server 160. The verification result can include the problem, the digitally signed problem, $sign_{150}$(problem), and a digitally signed version of the digitally signed problem, $sign_{160}(sign_{150}$(problem)), that is signed by problem verifier service 160.

In operation 330, first client device 110 can provide the problem, digitally signed problem, $sign_{150}$(problem), and digitally signed version of the digitally signed problem, $sign_{160}(sign_{150}$(problem)), and the original request for message service of operation 305, to the message service 130.

In operation 335, first client device 110 can optionally receive a confirmation from message service 130 that the message was sent to second (receiving) client device 110.

Figure 3B:
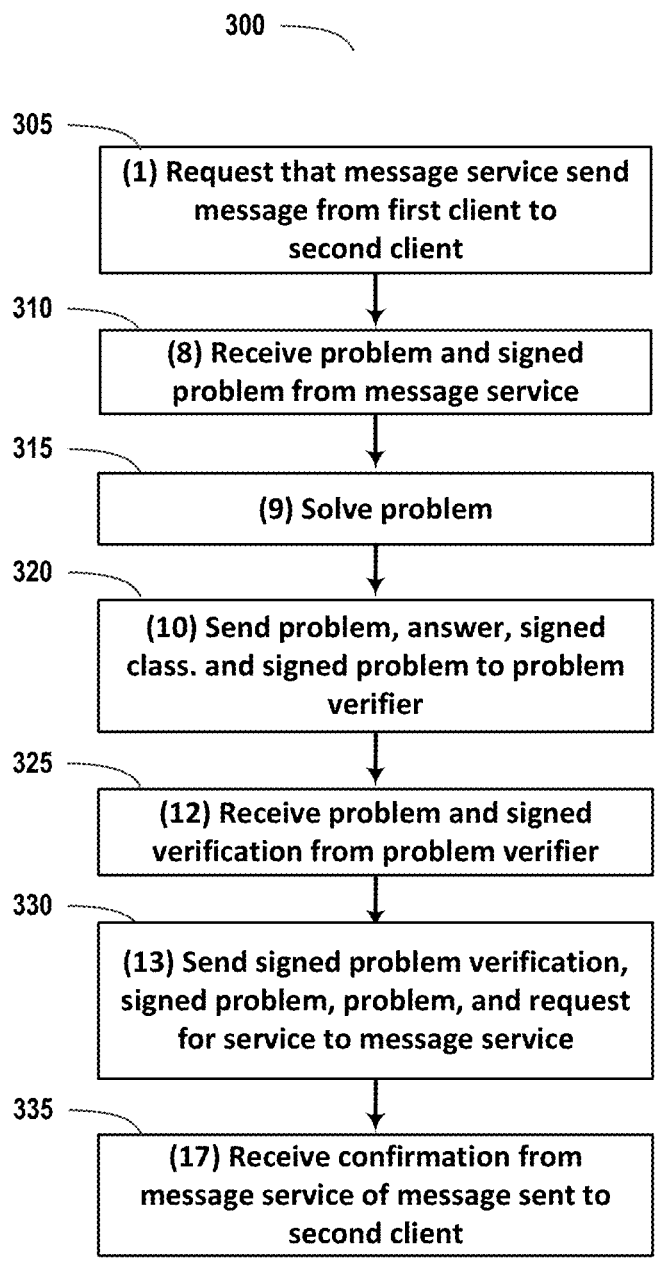
FIG. 3B illustrates, in block form, a method of sending a message by a first (sending) client device to a second (receiving) client device in a system that rate-limits interactions with a message service based on dynamically calculated values by supplying problems of varying difficulty to be solved to a sending client device, obtained by the message service from a problem service and provided to the sending client device, according to some embodiments.

FIG. 3B illustrates, in block form, a method 300 of a first client device 110 sending a message to a second (receiving) client device in a system 100 that rate-limits interactions with a message service 130 based on dynamically calculated values by supplying problems of varying difficulty to be solved to a sending client device 110, obtained by the message service 130 on behalf of the first client device 110, according to some embodiments. The following description of FIG. 3B is based upon the embodiment shown in FIG. 2B, wherein the message service 130 obtains the proof of work problem from the problem service 150 on behalf of the first client device 110.

In FIG. 3B, operation 305, a first (sending) client device 110 can request that message service 130 send a message to a second (receiving) client device.

In operation 310, first client device 110 can receive a proof of work problem, and a digitally signed version, $sign_{150}$(problem) of the proof of work problem from message service 130. The proof of work problem is selected by problem service 150 based upon a problem classification determined by fraud service 140, forwarded to message service 130, and forwarded again to problem service 150 on behalf of the first client device 110.

In operation 315, first client device 110 can attempt to solve the proof of work problem.

In operation 320, first client device 110 can send the proof of work problem, solution, and digitally signed proof of work problem, $sign_{150}$(problem) to a problem verifier service 160. In an embodiment, the first client device 110 can also send the digitally signed problem classification, $sign_{140}$(classification) to the problem verifier service 160.

In operation 325, first client device 110 can receive a verification result from problem verifier server 160. The verification result can include the problem, the digitally signed problem, $sign_{150}$(problem), and a digitally signed version of the digitally signed problem, $sign_{160}(sign_{150}$(problem)), that is signed by problem verifier service 160.

In operation 330, first client device 110 can provide the problem, digitally signed problem, $sign_{150}$(problem), and digitally signed version of the digitally signed problem, $sign_{160}(sign_{150}$(problem)), and the original request for message service of operation 305, to the message service 130.

In operation 335, first client device 110 can optionally receive a confirmation from message service 130 that the message was sent to second (receiving) client device 110.

Figure 4A:
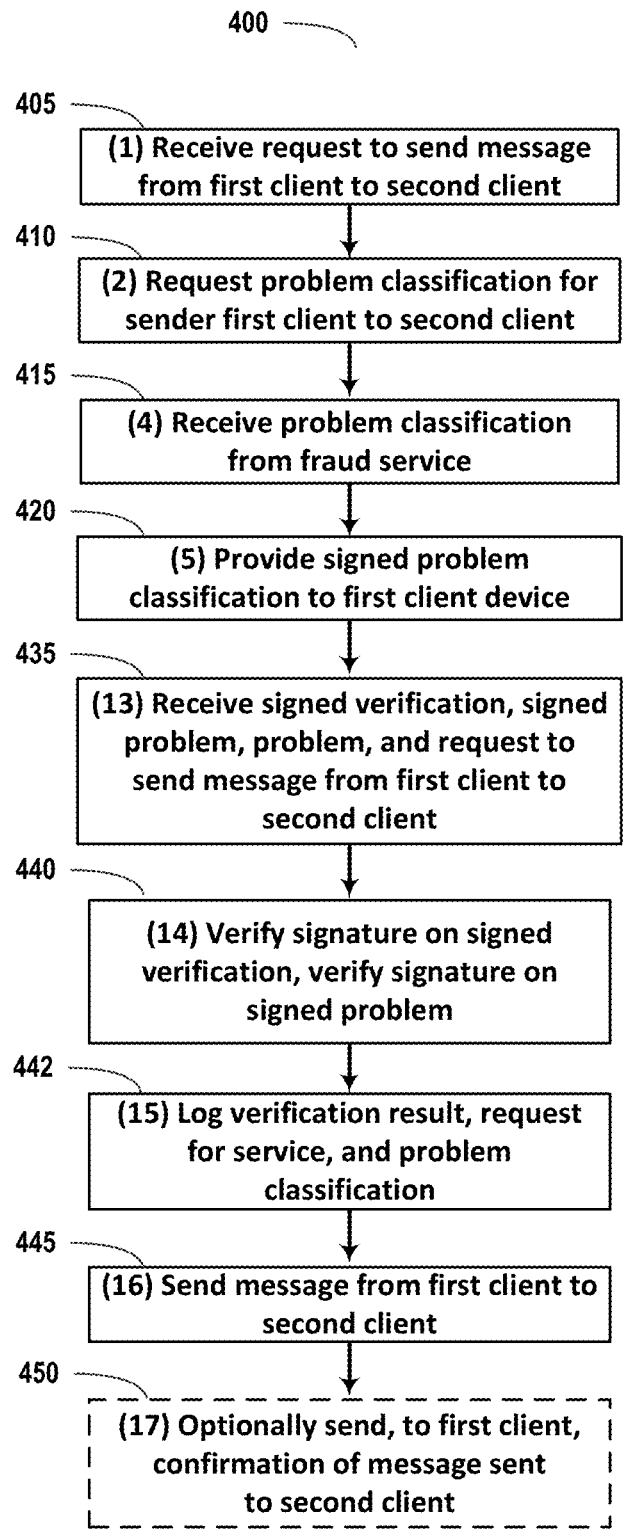
FIG. 4A illustrates, in block form, a method of message service processing a request from a client device that wants to send a message to a receiving client device in a system that rate-limits interactions with a message service based on dynamically calculated values by supplying problems of varying difficulty to be solved to a sending client device, obtained by the sending client device from a problem service, according to some embodiments.

FIG. 4A illustrates, in block form, a method 400 of message service 130 processing a request from a first client device 110 that wants to send a message to a second, receiving client device 110 in a system 100 that rate-limits interactions with the message service 130 based on dynamically calculated values by supplying problems of varying difficulty to be solved to the sending first client device 110, obtained by the sending client device 110 from a problem service 150, according to some embodiments. The following description of FIG. 4A is based upon the embodiment shown in FIG. 2A, wherein the first client device 110 requests the proof of work problem from the problem service 150.

In operation 405, message service 130 can receive a request for service from a first (sending) client device 110. The request can include a time stamp, and indication of the recipient address of the second (receiving) client device 110, and can further include device information such as hardware identifiers, a version of an operating system of the device, a BIOS identifier, a make and model of the hardware, e.g. Apple® iPhone 6S, one or more identifiers of the user of the first client device, such as sending phone number or email address, an account ID of a service account, such as a messaging account, an Apple® iTunes® account, and Apple® AppStore account, login credentials, or other user identification that may help identify the user and the first (sending) client device 110.

In operation 410, message service 130 can request from fraud service 140 a proof of work problem classification based upon a risk determination made by the fraud service 140 as to whether the first client device 110, or the user of the first client device 110, is likely a sender of spam messages. The greater the risk, the higher the proof of work problem classification, such that a user of a device known or suspected to send spam will receive a difficult proof of work problem that rate-limits the ability of the client device to send spam messages.

In operation 415, message service 140 can receive the problem classification from the fraud service 140. In an embodiment, the problem classification can be digitally signed by the fraud service 140, indicated by $sign_{140}$(classification), so that the message service 130 can verify that the sender of the problem classification was the fraud service 140.

In operation 420, message service 130 can provide the signed problem classification, $sign_{140}$(classification), to the first client device 110. First client device 110 can use the problem classification to request a proof of work problem from problem service 150, in accordance with the received problem classification.

In operation 435, message service 130 can receive from the problem verifier service 160, the problem, a verification result comprising: the digitally signed problem, $sign_{150}$(problem), and a digitally signed version of the digitally signed problem, $sign_{160}(sign_{150}$(problem)), signed by the problem verifier service 160, and the original request for service received in operation 405, above. The verification result can further include an indication that the first client device 110 correctly solved the proof of work problem in the amount of time allowed for a correct solution.

In operation 440, message service 130 can verify that the signature on the signed problem, $sign_{150}$(problem), is the signature of the problem service 150. This verifies that the problem solved in the verification result was generated by the problem service 150. Message service 130 can further verify that the signature on the digitally signed version of the problem, $sign_{160}(sign_{150}$(problem)), is the signature of the problem verifier service 160. This verifies that the verification result was generated by the problem verifier service 160. Message service 130 can further verify that the verification result indicates that the proof of work problem was solved by the first client device 110 within the amount of time allowed for a correct solution.

In operation 442, message service 130 can time stamp and log the receipt of the verification result, the message service 130 verification of the result, and the original request for service received from the first client device 110 in operation 405.

In operation 445, if the signatures and verification result are all verified, then message service 130 can transmit the message to the second (receiving) client device 110.

In operation 450, message service 130 can optionally send a confirmation message to the first client device 110 that the message was successfully sent to the second client device 110.

Figure 4B:
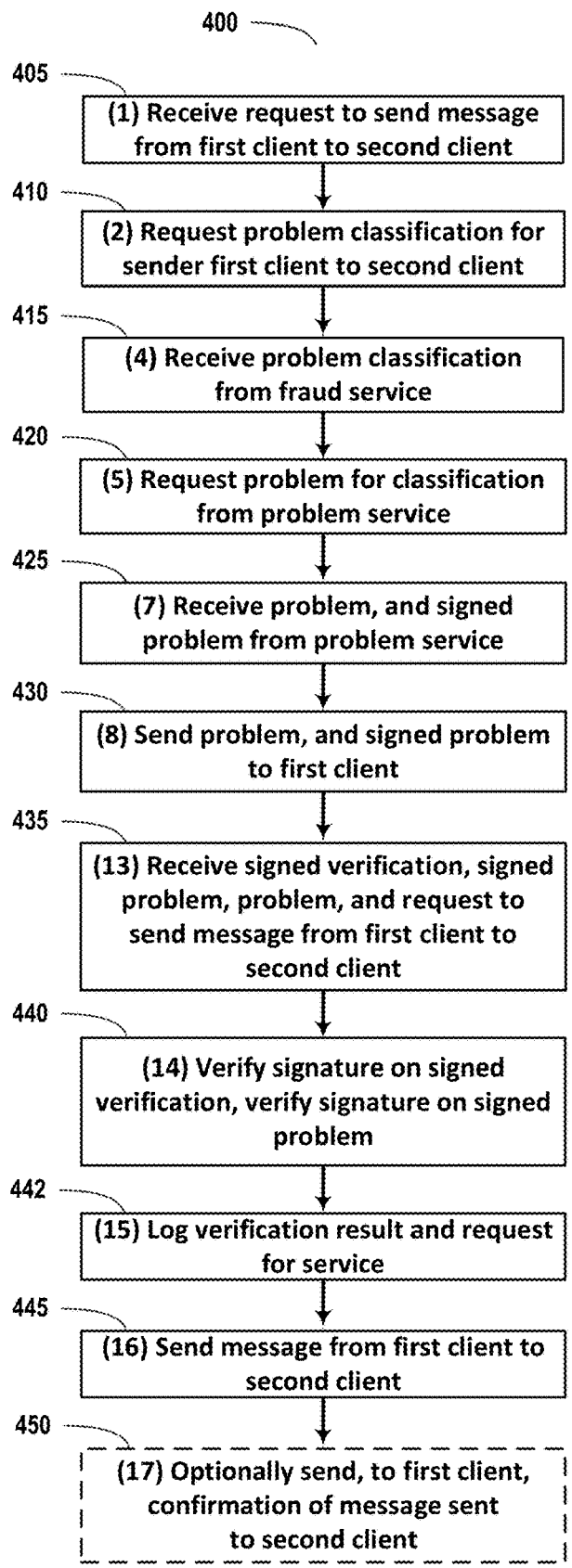
FIG. 4B illustrates, in block form, a method of a message service processing a request from a client device that wants to send a message to a receiving client device in a system that rate-limits interactions with a message service based on dynamically calculated values by supplying problems of varying difficulty to be solved to a sending client device, obtained by the message service from a problem service and provided to the sending client device, according to some embodiments.

FIG. 4B illustrates, in block form, a method 400 of message service 130 requesting a proof of work problem for a first client device 110 that wants to send a message to a second, receiving client device 110 in a system 100 that rate-limits interactions with the message service 130 based on dynamically calculated values by supplying problems of varying difficulty to be solved to the sending first client device 110, obtained by the message service 130 from a problem service 150, on behalf of the sending client device 110. The following description of FIG. 4B is based upon the embodiment shown in FIG. 2B, wherein the message service 130 requests the proof of work problem from the problem service 150 on behalf of the first client device 110.

In operation 405, message service 130 can receive a request for service from a first (sending) client device 110. The request can include a time stamp, and indication of the recipient address of the second (receiving) client device 110, and can further include device information such as hardware identifiers, a version of an operating system of the device, a BIOS identifier, a make and model of the hardware, e.g. Apple® iPhone 6S, one or more identifiers of the user of the first client device, such as sending phone number or email address, an account ID of a service account, such as a messaging account, an Apple® iTunes® account, and Apple® AppStore account, login credentials, or other user identification that may help identify the user and the first (sending) client device 110.

In operation 410, message service 130 can request from fraud service 140 a proof of work problem classification based upon a risk determination made by the fraud service 140 as to whether the first client device 110, or the user of the first client device 110, is likely a sender of spam messages. The greater the risk, the higher the proof of work problem classification, such that a user of a device known or suspected to send spam will receive a difficult proof of work problem that rate-limits the ability of the client device to send spam messages.

In operation 415, message service 140 can receive the problem classification from the fraud service 140. In an embodiment, the problem classification can be digitally signed by the fraud service 140, indicated by $sign_{140}$(classification), so that the message service 130 can verify that the sender of the problem classification was the fraud service 140.

In operation 420, message service 130 can provide the signed problem classification, $sign_{140}$(classification) to the first client device 110. First client device 110 can use the problem classification to request a proof of work problem from problem service 150, in accordance with the received problem classification.

In operation 425, message service 130 can receive the proof of work problem from the problem service 150, and a digitally signed copy of the problem, $sign_{150}$(problem).

In operation 430, message service 130 can send the unsigned proof of work problem, and digitally signed proof of work problem, $sign_{150}$(problem), to the first (sending) client device 110.

In operation 435, message service 130 can receive from the problem verifier service 160, the problem, a verification result comprising: the digitally signed problem, $sign_{150}$(problem), and a digitally signed version of the digitally signed problem, $sign_{160}(sign_{150}$(problem)), signed by the problem verifier service 160, and the original request for service received in operation 405, above. The verification result can further include an indication that the first client device 110 correctly solved the proof of work problem in the amount of time allowed for a correct solution.

In operation 440, message service 130 can verify that the signature on the signed problem, $sign_{150}$(problem), is the signature of the problem service 150. This verifies that the problem solved in the verification result was generated by the problem service 150. Message service 130 can further verify that the signature on the digitally signed version of the problem, $sign_{160}(sign_{150}$(problem)), is the signature of the problem verifier service 160. This verifies that the verification result was generated by the problem verifier service 160. In an embodiment, message service 130 can further verify that the verification result indicates that the proof of work problem was solved by the first client device 110 within the amount of time allowed for a correct solution.

In operation 442, message service 130 can time stamp and log the receipt of the verification result, the message service 130 validation of the verification results, and the original request for service received from the first client device 110 in operation 405.

In operation 445, if the signatures and verification result are verified, then message service 130 can transmit the message to the second (receiving) client device 110.

In operation 450, message service 130 can optionally send a confirmation message to the first client device 110 that the message was successfully sent to the second client device 110.

Figure 5:
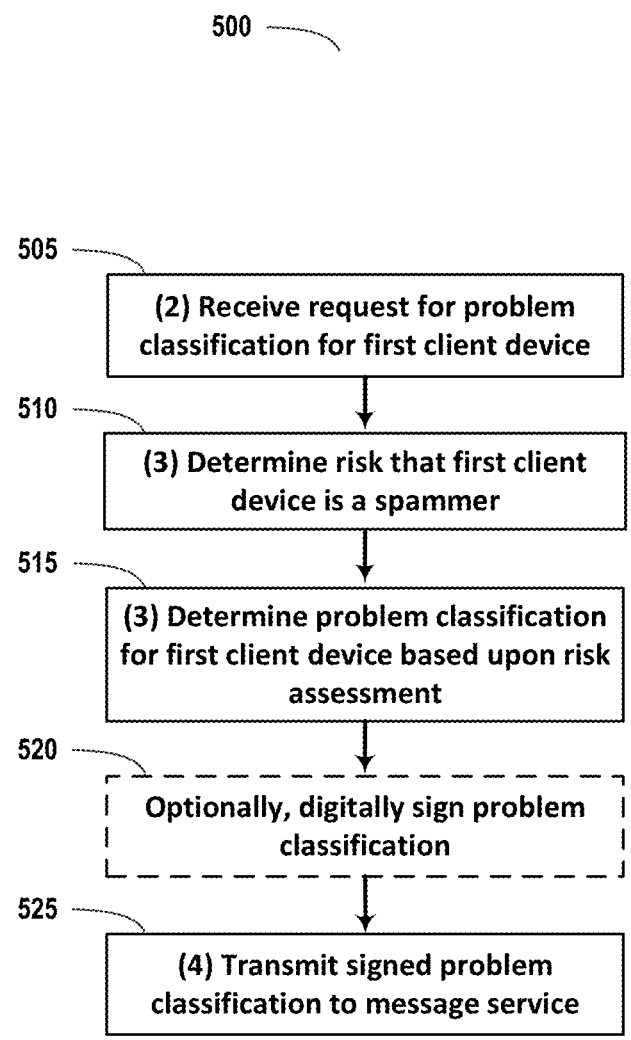
FIG. 5 illustrates, in block form, a method of fraud service determining a proof of work problem classification for a client device requesting transmission of a message in a system that rate-limits interactions with a message service based on dynamically calculated values by supplying problems of varying difficulty to be solved to a sending client device, according to some embodiments.

FIG. 5 illustrates, in block form, a method 500 of fraud service 140 determining a proof of work problem classification for a first client device 110 requesting transmission of a message in a system 100 that rate-limits interactions with a message service 130 based on dynamically calculated values by supplying problems of varying difficulty to be solved to a sending first client device 110, according to some embodiments.

In operation 505, fraud service 140 can receive a request for a proof of work problem classification for a first (sending) client device 110, to a second (receiving) client device 110, for a message to be sent by the message service 130 to the second client device 110. The request can include a time stamp and hardware and user information related to the first client device 110.

In operation 510, fraud service 140 can determine a risk that the first client device 110, or a user of the first client device 110, is likely to send a spam message. Fraud service 140 can use the hardware and user information to access a database of risk values to determine a risk of the first client device 110, or a user of the client device 110, being likely to send a spam messages. Fraud service 140 can also look up a service account, such as an Apple® iTunes® store, an AppStore, or other service to determine whether the user of the first client device 110 regularly buys content, music, applications, e-books, etc. that may indicate whether this is a non-spamming user. If the user is a new user with no history, then the fraud service 140 may assign a mid-level assessment of risk that the user is a spamming user.

In operation 515, fraud service 140 can use the risk assessment information to determine a problem classification for proof of work problems for the first client device 110 or a user of the first client device 110. If the risk assessment is that first client device 110 or user is likely to send a spam message, then the proof of work problem classification can indicate that the problem service 150 should assign a difficult proof of work problem to the first client device 110, to limit the rate at which the first client device 110 can send messages.

In operation 520, fraud service 140 can optionally digitally sign the problem classification, indicated as $sign_{140}$(classification), so that the message service 130, problem service 150, or problem verifier service 160 can verify that the problem classification was generated by the fraud service 140.

In operation 525, fraud service 140 can transmit the problem classification for the first client device 110, optionally digitally signed by the fraud service 140, to the message service 130.

Figure 6:
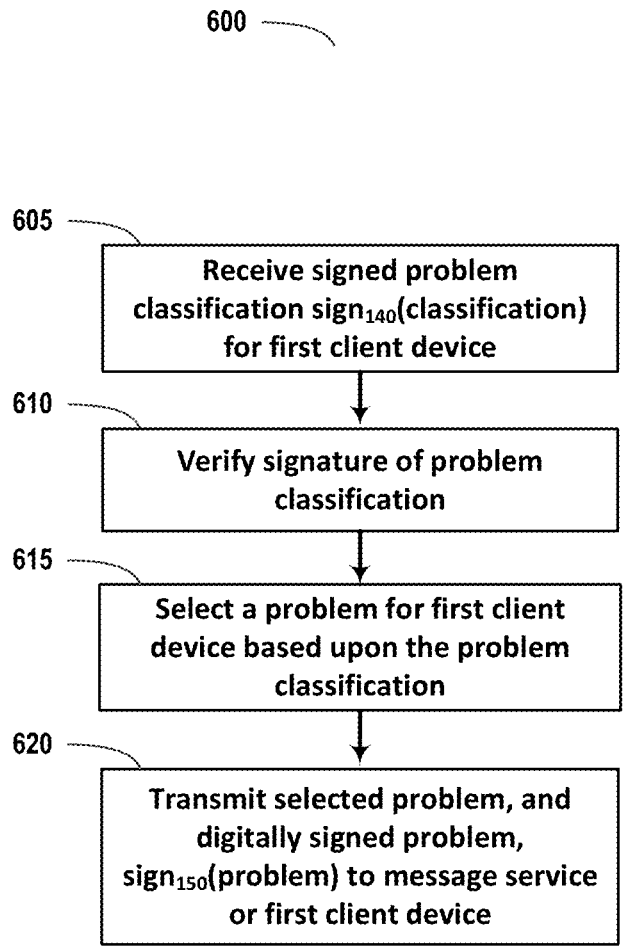
FIG. 6 illustrates, in block form, a method of a problem service determining a proof of work problem to assign to a client device based on a problem classification for the client device in a system that rate-limits interactions with a message service based on dynamically calculated values by supplying problems of varying difficulty to be solved to a sending client device, according to some embodiments.

FIG. 6 illustrates, in block form, a method 600 of a problem service 150 selecting a proof of work problem to assign to a first client device 110 based on a problem classification for the first client device 110 in a system 100 that rate-limits interactions with a message service 130 based on dynamically calculated values by supplying problems of varying difficulty to be solved to the sending first client device 110, according to some embodiments.

In operation 605, problem service 150 can receive a request to provide a proof of work problem based upon a problem classification within the request. In an embodiment as described above with reference to FIG. 2A, a first client device 110 can request a proof of work problem in accordance with a problem classification. The request can include the problem classification. In an embodiment, as described above with reference to FIG. 2B, the request can be received from message service 130, wherein message service 130 requests the proof of work problem in accordance with the problem classification, on behalf of the first client device 110. In an embodiment, the problem classification can be digitally signed by the fraud service 140, indicated as $sign_{140}$(classification). The problem classification can be digitally signed using a shared secret, such as a symmetric key, or a public key, of the fraud service 140.

In operation 610, problem service 150 can decrypt the digitally signed problem classification to verify the digital signature using a shared secret (key) with the fraud service 140, such as a symmetric or public key of the fraud service 140. The shared secret can be a symmetric key or a public key of an asymmetric key pair of the fraud service 140.

In operation 615, problem service 150 can select a proof of work problem based upon the problem classification in the request. The problem classification can indicate a type, or difficulty, of proof of work problem that the first (sending) client device 110 is to solve.

In operation 620, problem service 150 can digitally sign the selected proof of work problem, indicated as $sign_{150}$(problem). In an embodiment in accordance with FIG. 2A, above, wherein the request for a proof of work problem is received from the first client device 110, then unsigned proof of work problem and digitally signed proof of work problem can be transmitted to the first client device 110. In an embodiment in accordance with FIG. 2B, above, problem service 150 can then return the unsigned proof of work problem and the digitally signed proof of work problem to the requesting message service 130.

Figure 7:
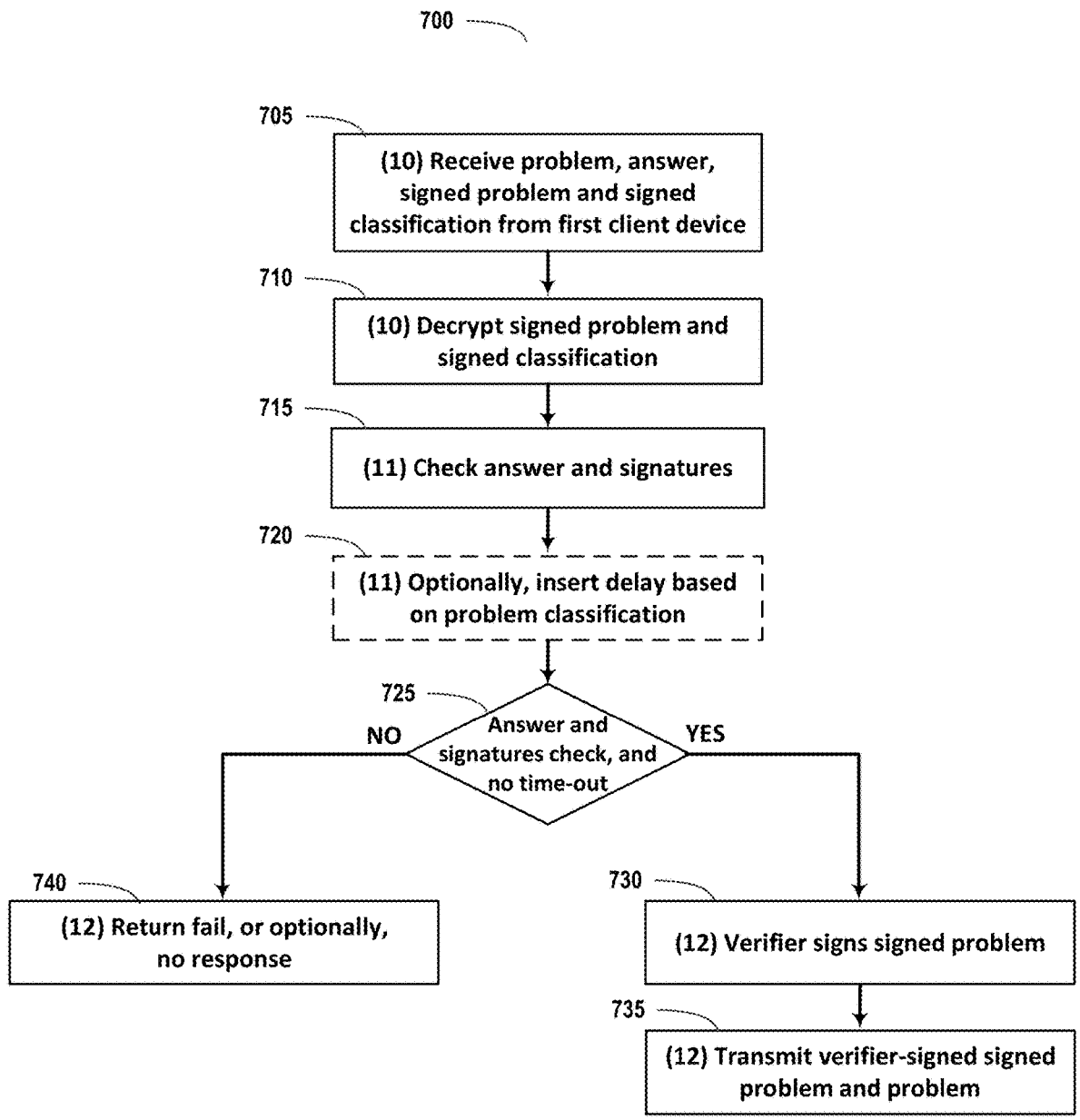
FIG. 7 illustrates, in block form, a method of a verifier service verifying a solution of a proof of work problem assigned to a client device based on a problem classification for the client device in a system that rate-limits interactions with a message service based on dynamically calculated values by supplying problems of varying difficulty to be solved to a sending client device, according to some embodiments.

FIG. 7 illustrates, in block form, a method 700 of a problem verifier service 160 verifying a solution to a proof of work problem assigned to a first client device 110 based on a problem classification for the first client device 110 in a system that rate-limits interactions with a message service 130 based on dynamically calculated values by supplying problems of varying difficulty to be solved to the sending first client device, according to some embodiments.

In operation 705, problem verifier service 160 can receive from first client device 110 a proof of work problem, a solution to the proof of work problem, and a digitally signed version of the proof of work problem, signed by problem service 150, indicated as $sign_{150}$(problem).

In operation 710, problem verifier service 160 can decrypt the digitally signed problem, $sign_{150}$(problem), using a shared secret with the problem service 150, such as a symmetric key or public key of an asymmetric key pair of the problem service 150. Problem verifier service 160 can further decrypt the digitally signed problem classification, $sign_{140}$(classification), using a shared secret with the fraud service 140, such as a symmetric key or public key of an asymmetric key pair of the fraud service 140.

In operation 715, problem verifier service 160 can determine whether the solution provided by the first client device 110 is the correct solution to the proof of work problem. Problem verifier service 160 can further determine, using time stamps in the digitally signed proof of work problem and the time of receipt of the solution in operation 705, whether the first client device 110 provided the correct solution to the proof of work problem within a predetermined allowed time window. The problem verifier service 160 can further compare the decrypted, digitally signed proof of work problem against the proof of work problem received from the first client device 110 to ensure that the proof of work problem and decrypted proof of work problem are the same. Problem verifier service 160 can also determine the validity of the signed problem classification, $sign_{140}$(classification), after decryption.

In operation 720, problem verifier service 160 can optionally insert a delay in responding to the request for verification of the proof of work problem. The delay, if any, can be based upon a difficulty of the proof of work problem, the proof of work problem classification, a type of hardware of the client, or a combination of these.

In operation 725, it can be determined whether the proof of work solution provided by the first client device 110 is correct, whether the digital signatures for the signed proof of work problem and signed problem classification are valid, and whether the correct solution to the proof of work problem was provided within a predetermined window of time. If so, then method 700 resumes at operation 730. Otherwise method 700 resumes at operation 740.

In operation 730, problem verifier service 160 can sign the digitally signed version of the proof of work problem, indicated by $sign_{160}(sign_{150}(problem))$. Message service 130 can decrypt the digitally signed version of the digitally signed proof of work problem using a shared secret with the problem verifier service 160 and problem service 150, such as a symmetric key or public key of each of the problem verifier service 160 and problem service 150.

In operation 735, problem verifier service 160 can transmit to the first client device 110 the digitally signed version of the digitally signed proof of work problem, the unsigned version of the proof of work problem, and an indication of whether the first client device 110 solved the proof of work problem correctly within a predetermined window of time.

In operation 740, if it has been determined in operation 725 that the solution to the proof of work problem was incorrect, or not provided within the required predetermined period of time, or the digital signature of the signed problem or signed classification are not correct, then the problem verification fails. In an embodiment, problem verifier service 160 can return an indication of failure to message service 130. In an embodiment wherein the problem verifier service 160 would return a verification result to the first client device 110, rather than the message service 130, the problem verifier service 160 optionally return no verification result, so as to prevent a potentially spamming client device from determining a reason that problem verification failed.

Figure 8:
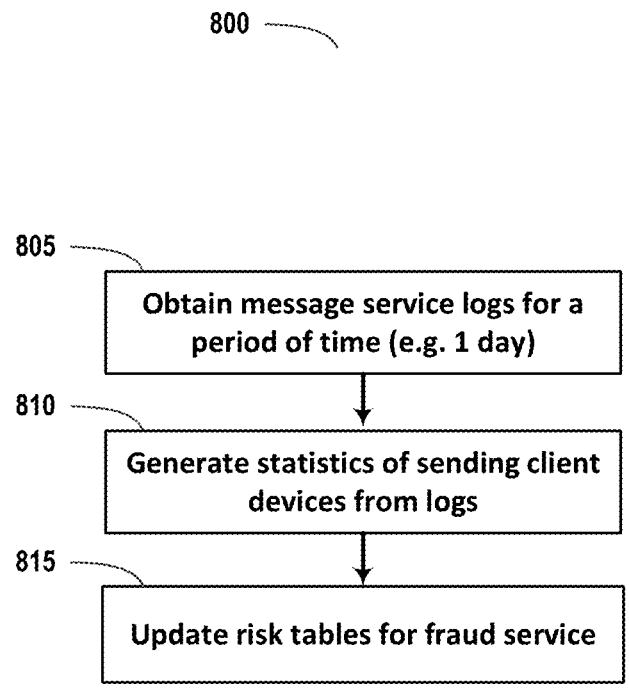
FIG. 8 illustrates, in block form, a method of an analytics service updating risk assessments of sending client devices in a system that rate-limits interactions with a message service based on dynamically calculated values by supplying problems of varying difficulty to be solved to a sending client device, according to some embodiments.

FIG. 8 illustrates, in block form, a method 800 of an analytics service 170 updating risk assessments of sending client devices 110 in a system that rate-limits interactions with a message service 130 based on dynamically calculated values by supplying problems of varying difficulty to be solved to a sending client device, according to some embodiments.

In operation 805, analytics service 170 can obtain logs from message service 130 for a predetermined period of time, e.g. one day. Logs can include a time stamped log of when message service 130 received a problem classification from fraud service 140 for a first client device 110 requesting that the message service 130 send a message to second client device 110. Logs can further include a time stamped log of message service 130 logging the receipt of a proof of work problem from problem service 150 that is related to a logged problem classification. Logs can further include a time stamped log of message service 130 logging the verification result received from problem verifier service 160.

In operation 810, analytics service 170 can generate statistics for use by fraud service 140 in updating one or more risk determination databases. Statistics can include, information identifying of a particular client, such as user identification, hardware identification, device type, operating system version, BIOS version, processor identifier, and whether the device is a virtual device. Statistics for each client can further include a number of message sending requests received by the message service 130 from the client device 110, a number of messages sent by the message service 130 on behalf of the client device 110, or a number of messages received by the client device 110. Statistics for each sending client can further include failure indications, such as a number of incorrect solutions to proof of work problems, an average difficulty or problem classification of the proof of work problems assigned to the client device 110, a number of timeouts to proof of work problem solutions, or a number of incorrect digital signatures provided by the client device 110. Statistics can also include location information of the sending client device 110 such as an internet protocol (IP) address of the sending client device, or a country of origin of the client device 110.

In operation 815, analytics service 170 can update one or more risk determination databases on behalf of the fraud service 140. In an embodiment, analytics service 170 can provide a report of the statistics generated to the fraud service 140. Fraud service 140 can then update the risk assessment databases.

Figure 9:
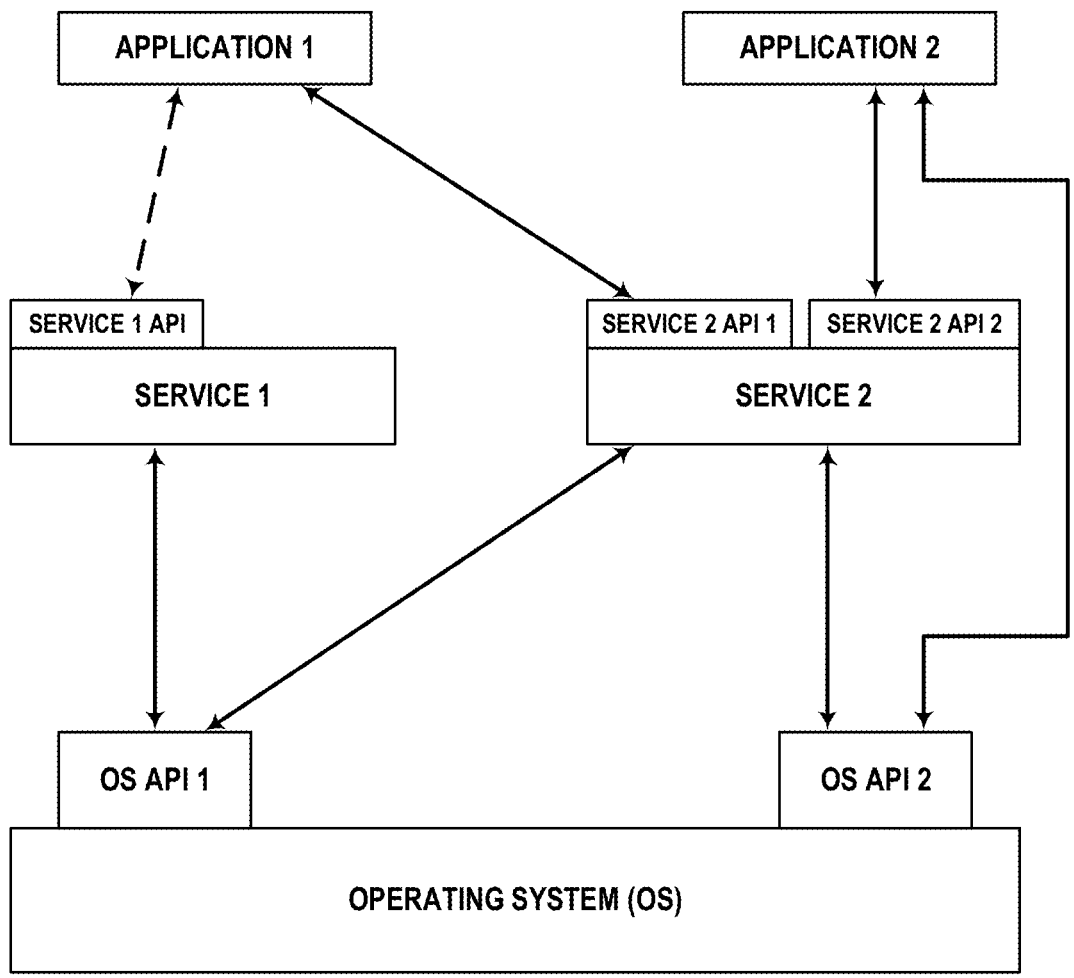
FIG. 9 illustrates an exemplary embodiment of a software stack usable in some embodiments of the invention.

In FIG. 9 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 10:
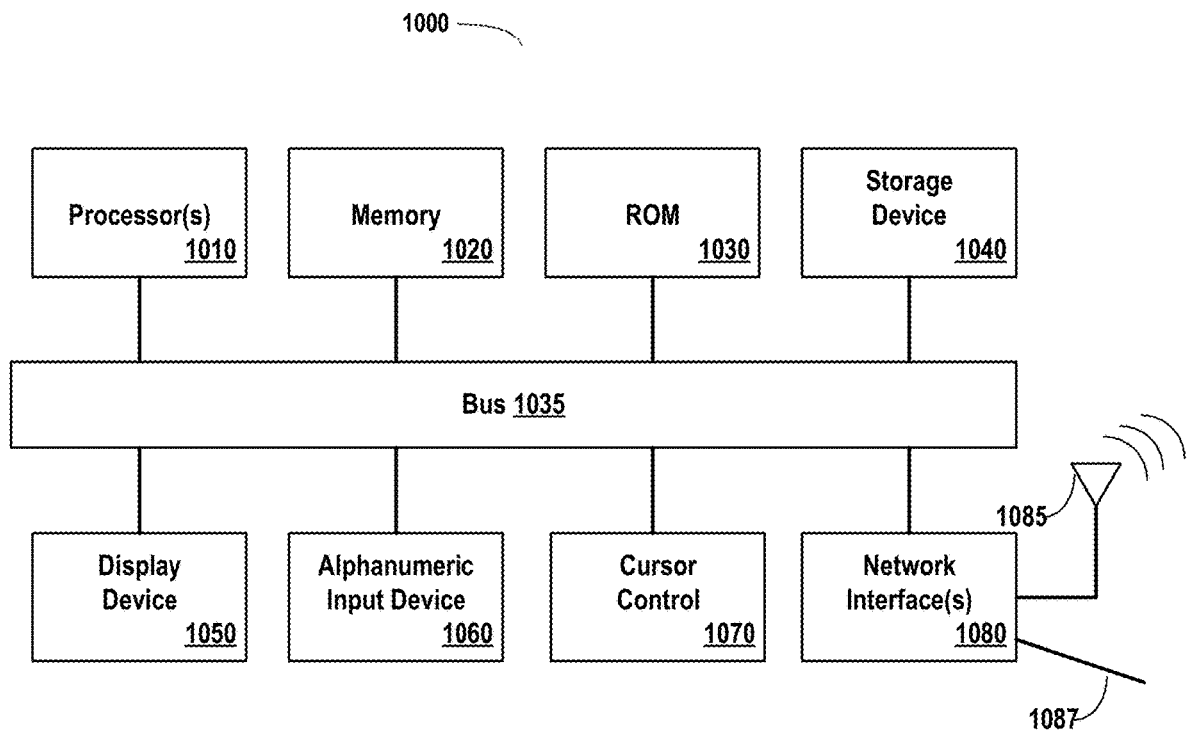
FIG. 10 is a block diagram of one embodiment of a computing system.

FIG. 10 is a block diagram of one embodiment of a computing system 1000. The computing system illustrated in FIG. 10 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 10 may be used to provide the computing device and/or the server device.

Computing system 1000 includes bus 1005 or other communication device to communicate information, and processor 1010 coupled to bus 1005 that may process information.

While computing system 1000 is illustrated with a single processor, computing system 1000 may include multiple processors and/or co-processors 1010. Computing system 1000 further may include random access memory (RAM) or other dynamic storage device 1020 (referred to as main memory), coupled to bus 1005 and may store information and instructions that may be executed by processor(s) 1010. Main memory 1020 may also be used to store temporary variables or other intermediate information during execution of instructions by processor 1010.

Computing system 1000 may also include read only memory (ROM) and/or other static storage device 1040 coupled to bus 1005 that may store static information and instructions for processor(s) 1010. Data storage device 1040 may be coupled to bus 1005 to store information and instructions. Data storage device 1040 such as flash memory or a magnetic disk or optical disc and corresponding drive may be coupled to computing system 1000.

Computing system 1000 may also be coupled via bus 1005 to display device 1050, such as a cathode ray tube (CRT) or liquid crystal display (LCD), to display information to a user. Computing system 1000 can also include an alphanumeric input device 1060, including alphanumeric and other keys, which may be coupled to bus 1005 to communicate information and command selections to processor(s) 1010. Another type of user input device is cursor control 1070, such as a touchpad, a mouse, a trackball, or cursor direction keys to communicate direction information and command selections to processor(s) 1010 and to control cursor movement on display 1050. Computing system 1000 may also receive user input from a remote device that is communicatively coupled to computing system 1000 via one or more network interfaces 1080.

Computing system 1000 further may include one or more network interface(s) 1080 to provide access to a network, such as a local area network. Network interface(s) 1080 may include, for example, a wireless network interface having antenna 1085, which may represent one or more antenna(e). Computing system 1000 can include multiple wireless network interfaces such as a combination of WiFi, Bluetooth® and cellular telephony interfaces. Network interface(s) 1080 may also include, for example, a wired network interface to communicate with remote devices via network cable 1087, which may be, for example, an Ethernet cable, a coaxial cable, a fiber optic cable, a serial cable, or a parallel cable.

In one embodiment, network interface(s) 1080 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1080 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method practiced on a first client device, comprising:
   requesting that a message service transmit a message from the first client device to a second client device;
   receiving, in response to the request, a classification of proof of work problems, wherein a difficulty level associated with the classification of proof of work problems dynamically changes over time in response to a history related to messages sent by the first client device;
   requesting a proof of work problem in accordance with the received classification of proof of work problems;
   receiving the proof of work problem based on the classification of proof of work problems, in response to the request;
   providing to a solution to the proof of work problem to a problem verifier service;
   transmitting a result of the problem verifier service to the message service;
   receiving confirmation that the message service sent the message to the second client device.

2. The method of claim 1, the message is transmitted in response to the first client device providing a correct solution to the proof of work problem within a predetermined period of allotted time.

3. The method of claim 1, wherein the difficulty level associated with the classification of the proof of work problems is based upon one or more attributes of the first client device, or a user of the first client device.

4. The method of claim 1, wherein the request that the message service transmit a message includes an address associated with the first client device, an address associated with the second client device, and a time stamp and the proof of work problem solution is valid for only the first client device, the second client device, and within a time window based at least in part on the time stamp of the request.

5. The method of claim 4, wherein the result of the verifier service indicates a time stamp that the proof of work problem was verified as solved correctly, and the verifier service time stamp minus the request time stamp determines a period of time that it took the first client device to solve the proof of work problem.

6. The method of claim 1, wherein:
   the classification of the proof of work problem is digitally signed and the proof of work problem is digitally signed; and
   the first client device retains the digitally signed proof of work problem and classification of the proof of work problem such that the message service is stateless with respect to the first client device, problem classification, and proof of work problem.

7. A non-transitory computer readable medium comprising instructions that, when executed by a processing system comprising at least one hardware processor, perform operations comprising:
   requesting that a message service transmit a message from a first client device to a second client device;
   receiving, in response to the request, a classification of proof of work problems, wherein a difficulty level associated with the classification of proof of work problems dynamically changes over time in response to a history related to messages sent by the first client device;
   requesting a proof of work problem in accordance with the received classification of proof of work problems;
   receiving the proof of work problem based on the classification of proof of work problems, in response to the request;
   providing to a problem verifier service, a solution to the proof of work problem;
   transmitting a result of the problem verifier service to the message service;
   receiving confirmation that the message service sent the message to the second client device.

8. The medium of claim 7, wherein the message is transmitted in response to the first client device providing a correct solution to the proof of work problem within a predetermined period of allotted time.

9. The medium of claim 7, wherein the difficulty level associated with the classification the proof of work problem is based upon one or more attributes of the first client device, or a user of the first client device.

10. The medium of claim 7, wherein the request that the message service transmit a message includes an address associated with the first client device, an address associated with the second client device, and a time stamp and the proof of work problem solution is valid for only the first client device, the second client device, and within a time window based at least in part on the time stamp of the request.

11. The medium of claim 10, wherein the result of the verifier service indicates a time stamp that the proof of work problem was verified as solved correctly, and the verifier service time stamp minus the request time stamp determines a period of time that it took the first client device to solve the proof of work problem.

12. The medium of claim 7, wherein:
the classification of the proof of work problem is digitally signed and the proof of work problem is digitally signed; and
the first client device retains the digitally signed proof of work problem and classification of the proof of work problem such that the message service is stateless with respect to the first client device, problem classification, and proof of work problem.

13. A system comprising:
a processing system having at least one hardware processor, coupled to a memory, the memory containing executable instructions that, when executed by the processing system, perform operations comprising:
requesting that a message service transmit a message from a first client device to a second client device;
receiving, in response to the request, a classification of proof of work problems, wherein a difficulty level associated with the classification of proof of work problems dynamically changes over time in response to a history related to messages sent by the first client device;
requesting a proof of work problem in accordance with the received classification of proof of work problems;
receiving the proof of work problem based on the classification of proof of work problems, in response to the request;
providing to a problem verifier service, a solution to the proof of work problem;
transmitting a result of the problem verifier service to the message service;
receiving confirmation that the message service sent the message to the second client device.

14. The system of claim 13, wherein the message is transmitted in response to the first client device providing a correct solution to the proof of work problem within a predetermined period of allotted time.

15. The system of claim 13, wherein the difficulty level associated with the classification of the proof of work problems is based upon one or more attributes of the first client device, or a user of the first client device.

16. The system of claim 13, wherein the request that the message service transmit a message includes an address associated with the first client device, an address associated with the second client device, and a time stamp and the proof of work problem solution is valid for only the first client device, the second client device, and within a time window based at least in part on the time stamp of the request.

17. The system of claim 16, wherein the result of the verifier service indicates a time stamp that the proof of work problem was verified as solved correctly, and the verifier service time stamp minus the request time stamp determines a period of time that it took the first client device to solve the proof of work problem.

18. The system of claim 13, wherein:
the classification of the proof of work problem is digitally signed and the proof of work problem is digitally signed; and
the first client device retains the digitally signed proof of work problem and classification of the proof of work problem such that the message service is stateless with respect to the first client device, problem classification, and proof of work problem.

* * * * *